United States Patent

Grünsch et al.

[11] Patent Number: 4,580,089
[45] Date of Patent: Apr. 1, 1986

[54] SWITCHING VOLTAGE REGULATOR INCLUDING A DEVICE FOR DETECTING THE AVERAGE VALUE OF THE OUTPUT VOLTAGE

[75] Inventors: Eckhardt Grünsch, Allmersbach; Jürgen Saxarra, Bachnang, both of Fed. Rep. of Germany

[73] Assignee: ANT Nachrichtentechnik GmbH, Backnang, Fed. Rep. of Germany

[21] Appl. No.: 570,683

[22] Filed: Jan. 13, 1984

[30] Foreign Application Priority Data

Jan. 14, 1983 [DE] Fed. Rep. of Germany ....... 3301068

[51] Int. Cl.$^4$ .............................................. G05F 1/56
[52] U.S. Cl. ...................................... 323/287; 323/285
[58] Field of Search ................. 323/284, 285, 286, 287

[56] References Cited

U.S. PATENT DOCUMENTS

| | | | |
|---|---|---|---|
| 3,417,321 | 12/1968 | Clapp | 323/286 |
| 3,781,653 | 12/1973 | Marini | 323/287 |
| 3,931,566 | 1/1976 | Pask et al. | 323/285 |
| 4,258,309 | 3/1981 | Ohsaka et al. | 323/287 |
| 4,321,526 | 3/1982 | Weischedel | 323/284 |

FOREIGN PATENT DOCUMENTS 661531  5/1979  U.S.S.R. ............................... 323/287

OTHER PUBLICATIONS

Keller, Richard, "Closed-Loop Testing and Computer Analysis Aid Design of Control Systems", *Electronic Design* 24, (1978), pp. 132–138.

Primary Examiner—Patrick R. Salce
Assistant Examiner—D. L. Rebsch
Attorney, Agent, or Firm—Spencer & Frank

[57]  ABSTRACT

A switching regulator whose switching transistor is controlled by a pulse width modulator wherein an electronic switch is provided which connects the potential carrying output terminal of the switching regulator with a control input of the pulse width modulator (PWM) as long as energy is flowing out of the smoothing capacitor at the output end of the switching regulator. This arrangement permits detection of the average value of the output voltage without the need for phase integration members.

15 Claims, 9 Drawing Figures

SWITCHING VOLTAGE REGULATOR INCLUDING A DEVICE FOR DETECTING THE AVERAGE VALUE OF THE OUTPUT VOLTAGE

BACKGROUND OF THE INVENTION

The present invention relates to a switching voltage regulator of the type including a switching transistor connected between an input terminal and the potential-carrying output terminal of the regulator and controlled by the output of a pulse width modulator, a measuring sensor provided in the output circuit of the regulator for detecting the alternating component of the output voltage or current, and a comparator having one input connected to the output of the measuring sensor and a second input connected to a reference voltage source.

A switching regulator of the above described type is disclosed in Electronic Design, Nov. 22, 1978, page 134. This switching regulator has a measuring sensor in its output circuit to detect the output voltage and feed the average thereof, which has been integrated via an RC member, to a comparator. The pulse width for the switching regulator is controlled in dependance on the magnitude of this integrated average value. Integration via the RC member is necessary to keep the regulating circuit stable and protect the switching regulator against disturbances or overshooting when there is a change of load. The limit frequency of the RC member determines the regulating speed of the switching regulator.

SUMMARY OF THE INVENTION

It is the object of the present invention to design a switching regulator of the type discussed above so that the regulating circuit is able to react quickly to changes in the output voltage; i.e. the phase shifting characteristics of the RC members in the regulating circuit will no longer have an adverse influence on the regulating speed and thus the phase reverse is increased.

The above object is accomplished according to the present invention by a switching voltage regulator circuit which comprises: first and second input terminals for a source of unregulated voltage and first and second output terminals for connection to a load with the second input terminal and the second output terminal both being connected to a point of reference potential; a switching transistor having its emitter-collector path connected between the first input and first output terminals; a pulse width modulator having an output connected to the base of the switching transistor for controlling the transistor; measuring sensor means, connected to the output terminals, for detecting the alternating component of the output voltage or current of the regulator; a comparator having a first input connected to the output of measuring sensor means and a second input connected to a source of reference voltage; an electronic switch having a first terminal connected to the first output terminal and a second terminal connected to the control input of the pulse width modulator; storage means, connected between the second terminal of the electronic switch and the point of reference potential, for storing the momentory value of the output voltage of the switching regulator when the electronic switch is closed; and the output of the comparator is connected with the control input of the electronic switch to control the closing and opening of same.

The measuring sensor means may be realized in a number of different configurations. According to one embodiment the measuring sensor means comprises a measurement transformer having its primary winding connected between the potential-carrying first output terminal of the regulator and one end of a smoothing capacitor whose other end is connected to the second output terminal, i.e. to the point of reference potential, e.g. ground, and having its second winding connected in parallel with a measuring resistor across the inputs of the comparator.

According to another embodiment of the invention the measuring sensor means comprises a direct voltage separating capacitor connected between the potential-carrying first output terminal of the regulator and the first input of the comparator, and a measuring resistor connected across the inputs of the comparator, and a smoothing capacitor is connected across the output terminals of the regulator.

According to a further feature of the invention, a further comparator may be provided so that its output is connected to the control input of the electronic switch and its two inputs are charged respectively with the reference voltage applied to the other comparator and with a value proportional to the output voltage of the regulator such that the response value of the further comparator for closing the electronic switch is higher than that of the other comparator.

Finally according to a still further feature of the invention a further electronic switch is connected in parallel with the first electronic switch and the control input of the further electronic switch is connected to the output of the clock pulse generator for the pulse width modulator.

The present invention is based on the fact that the pulsating characteristic of the current in the smoothing choke of the switching regulator, which current is an alternating current flowing through the smoothing capacitor, generates a voltage proportional to the alternating current across the measuring resistor of the comparator. Additionally, a voltage, likewise porportional to the alternating current, is also generated by the alternating current across the equivalent resistance of the smoothing capacitor under the condition that the reactance of the smoothing capacitor is much smaller than its effective resistance. This voltage is superposed on the output voltage of the switching regulator. The comparator is connected to the measuring resistor in such a manner that, at the moment of zero passage of the current or the voltage, respectively, the comparator opens the electronic switch and keeps this switch open as long as current flows into the smoothing capacitor and the momentary value of the output voltage is greater than the average value of the output voltage, respectively. During the time that current flows out of the smoothing capacitor and the momentary value of the output voltage is less than the average value of the output voltage, the electronic switch remains closed.

The present invention will now be explained in detail with the aid of the drawings.

DETAILED DESCRIPTION OF THE DRAWINGS

FIG. 6 is a schematic circuit diagram of another modification of the switching regulator of FIG. 1 with a forced or positive switch-on.

DETAILED DESCRIPTION OF THE PREFERRED EMBODIMENTS

Figure 1:
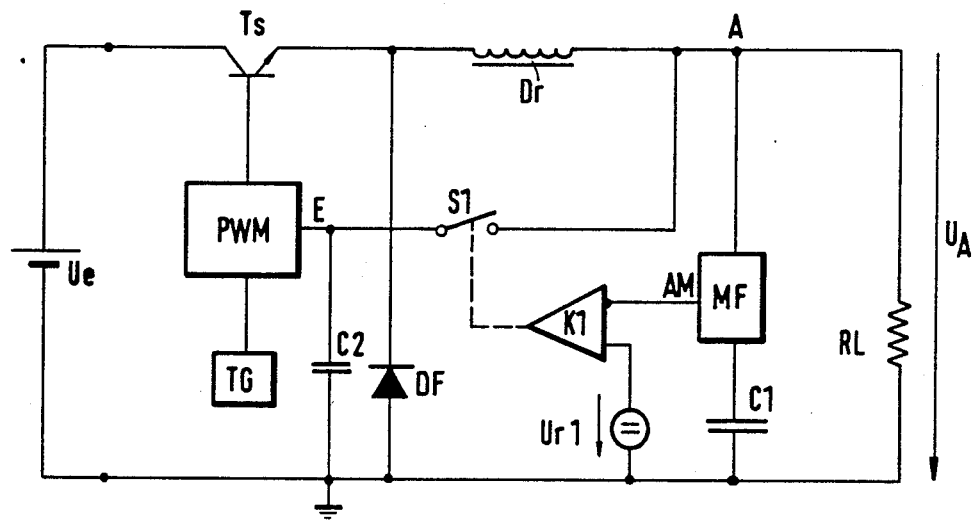
FIG. 1 is a basic schematic circuit diagram of a switching regulator according to the present invention.

In FIG. 1, the input voltage source is marked Ue. A switching transistor Ts has its emitter-collector path connected between one terminal of the input voltage source and the potential carrying output terminal A, and its base controlled by the output of a pulse width modulator PWM. A clock pulse generator TG, whose output is connected with the pulse width modulator PWM, determines the switching frequency of the pulse width modulation and thus of the switching transistor Ts. The switch-on duration of switching transistor Ts is determined by a signal at the control input E of the pulse width modulator PWM. A smoothing choke Dr is connected in series with switching transistor Ts and the output terminal A. An idling diode DF has its cathode connected to the common connecting line of the switching transistor Ts and the choke Dr, and its anode connected to a point of reference potential, i.e., the common ground line of the switching regulator. A load resistor RL is disposed between the potential carrying output terminal A and the common ground line. Across this load resistor RL there appears the output voltage $U_A$ of the switching regulator. The load resistor RL is connected in parallel with the smoothing capacitor C1 and with a measuring sensor MF which detects the alternating component of the output voltage or of the output current of the switching regulator. The output AM of measuring sensor MF is connected with a first input of a comparator K1. The second input of this comparator K1 is charged with a reference voltage Ur1. The output of comparator K1 is connected with the control input of an electronic switch S1 which, when closed, connects the potential carrying output terminal A of the switching regulator with the control input E of the pulse width modulator PWM. A storage capacitor C2 for the momentary value of the output voltage $U_A$ is connected between the input E of the pulse width modulator and the ground line.

Figure 2:
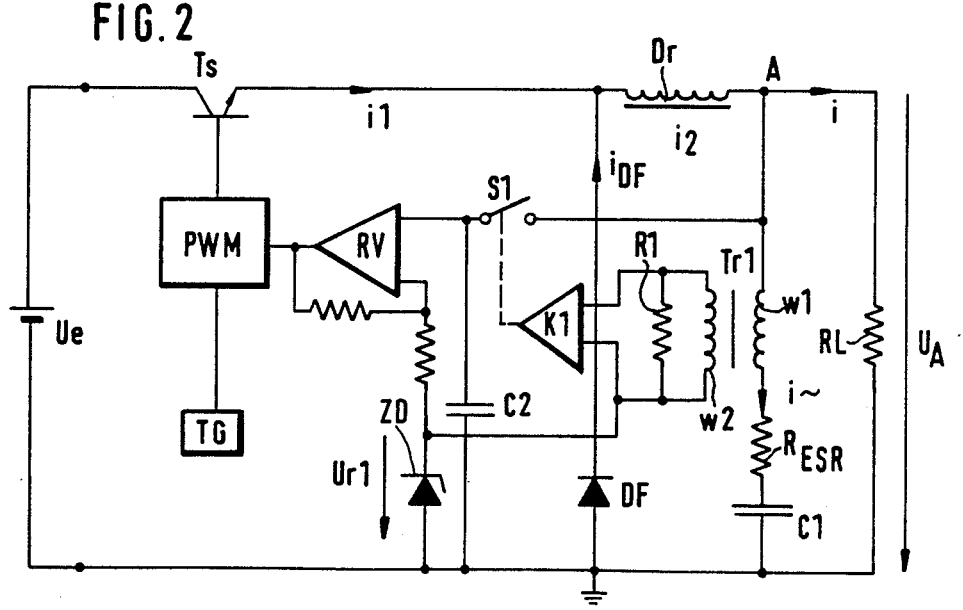
FIG. 2 is a schematic circuit diagram of a modification of the switching regulator of FIG. 1 wherein the measuring sensor is designed as a measurement transformer.

FIG. 2 shows a switching regulator which has the same basic design as the switching regulator of FIG. 1. The measuring sensor MF here comprises a measurement transformer Tr1. The primary winding w1 of this measurement transformer Tr1 is connected between the potential carrying output terminal A and one terminal of the smoothing capacitor C1. In order to explain below the mode of operation of the switching regulator, the ohmic equivalent resistance $R_{ERS}$ of the smoothing capacitor C1 is shown separately. The secondary winding w2 of the measurement transformer Tr1 is connected across the inputs of comparator K1 and in parallel with a measuring resistor R1. Between the output of electronic switch S1 and the input E of pulse width modulator PWM there is connected, in a deviation from the circuit of FIG. 1, a regulating amplifier RV. Moreover, as shown, the reference voltage Ur1 is realized by means of a Zener diode ZD.

For the considerations below it is assumed that the reactance of the smoothing capacitor C1 is very much smaller than its effective resistance, i.e.:

$R_{ERS} >> 1/(\omega C1)$

This condition is almost always met for switching regulators having a relatively high switching frequency (20 Khz) and conventional smoothing capacitors. Under this condition, the voltage drop across $R_{ERS}$ is proportional to the alternating current i.

Figure 3:
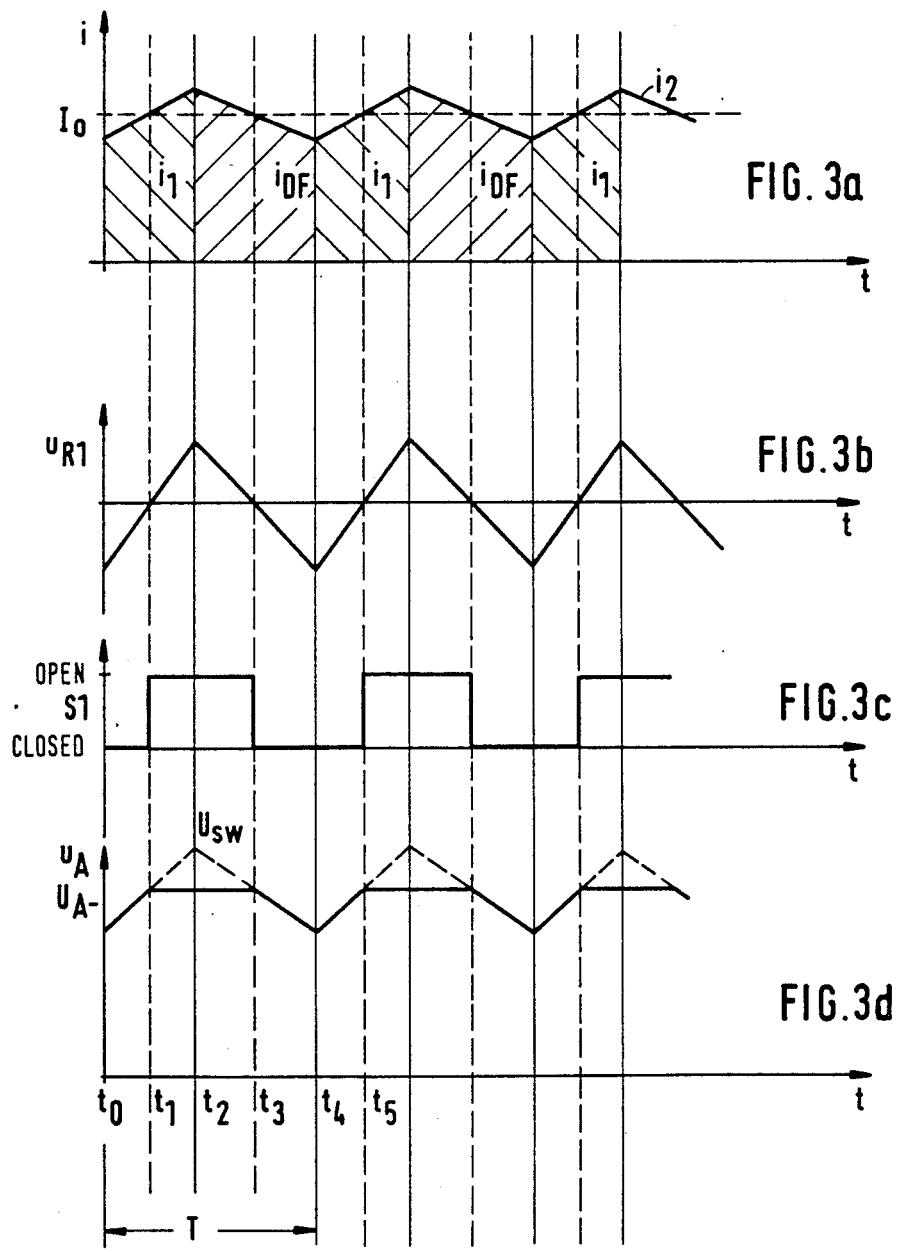
FIGS. 3a-3d illustrate current and voltage curves for the switching regulator according to FIG. 2.

FIG. 3 shows the current and voltage curves of the switching regulator according to FIG. 2 over time.

FIG. 3a shows the current $i_1$ through switching transistor Ts. This current $i_1$ flows between times $t_0$ and $t_2$. At time $t_2$ this current is replaced by the current $i_{DF}$ through idling diode DF. Current $i_{DF}$ flows until the end of a switching period T. The curve of current $i_2$ through choke Dr is likewise shown in FIG. 3a. The average value for the direct current of load resistor RL is marked $I_O$.

The pulsating current of the smoothing choke Dr, which flows as an alternating current $i\sim$ through smoothing capacitor C1, is transformed with the aid of measuring transformer Tr1 and generates a voltage $U_{R1}$ proportional to the alternating current across measuring resistor R1. The time curve for this voltage $U_{R1}$ is shown in FIG. 3b. Additionally, the alternating current generates a voltage $U_{RESR}$ across the equivalent resistor $R_{ESR}$ of smoothing capacitor C1. This voltage is likewise proportional to the alternating current $i\sim$ and is superposed on the output voltage $U_A$. Its time curve corresponds to the curve in FIG. 3b.

Comparator K1 is connected to measuring resistor R1 in such a manner that it opens the electronic switch S1 when the current or voltage, respectively, goes through zero and keeps the switch open as long as current flows into smoothing capacitor C1 and the alternating component of the output voltage $U_A$ is greater than the average value of the output voltage, see FIGS. 3c and 3d.

During the time that current flows out of smoothing capacitor C1 and the output voltage $U_A$ is less than the average value of the output voltage, the electronic switch S1 remains closed.

This process will now be explained in greater detail.

At the time when the switching transistor Ts becomes conductive, current still flows out of smoothing capacitor C1. This means that electronic switch S1 is closed and storage capacitor C2 is low-ohmicaly connected with output voltage $U_A$ so as to be able to adapt itself to the output voltage.

The limit frequency resulting from the low ohmic internal resistance of electronic switch S1 and the low capacitance of storage capacitor C2 is so high that voltage $U_{C2}$ is able to follow the pulsations of the output voltage. This also means that this RC member has hardly any influence on the regulating current. With the rise in current i1, the output voltage $U_A$ also rises and so does voltage $U_{C2}$. At the same time, the current flowing out of capacitor C1 decreases steadily. At time t1, current $i\sim = 0$. That means that the voltage drop across the equivalent series resistor $R_{ESR}$ of smoothing capacitor C1 is also zero. This means that at this time the output voltage, and thus also voltage $U_{C2}$, are exactly as high as the average value of the output voltage. Since the current $i_1$ continues to rise, current now begins to flow into capacitor C1. However, as soon as current flows into capacitor C1, voltage $U_{R1}$ changes polarity with the result that the comparator K1 switches and electronic switch S1 is opened (FIGS. 3b and 3c).

Electronic switch S1 now remains open until voltage $U_{R1}$ changes polarity again (time t3), i.e. until current begins to flow out of the capacitor $C_1$ again. Then electronic switch S1 is closed again and storage capacitor C2 is connected low-ohmicly with the output voltage $U_A$. During the time that switch S1 is open, smoothing capacitor C1 retains its voltage, which is equal to the average value of the output voltage, and is available as a switching criterion at the time of turn-off t2 of switching transistor Ts.

Since this voltage is a direct voltage, it can be fed directly to the regulating amplifier RV without integration. This has the advantage that an integration member, and the phase shift connected therewith, can be omitted, which means that the switching regulator becomes significantly more stable.

Figure 4:
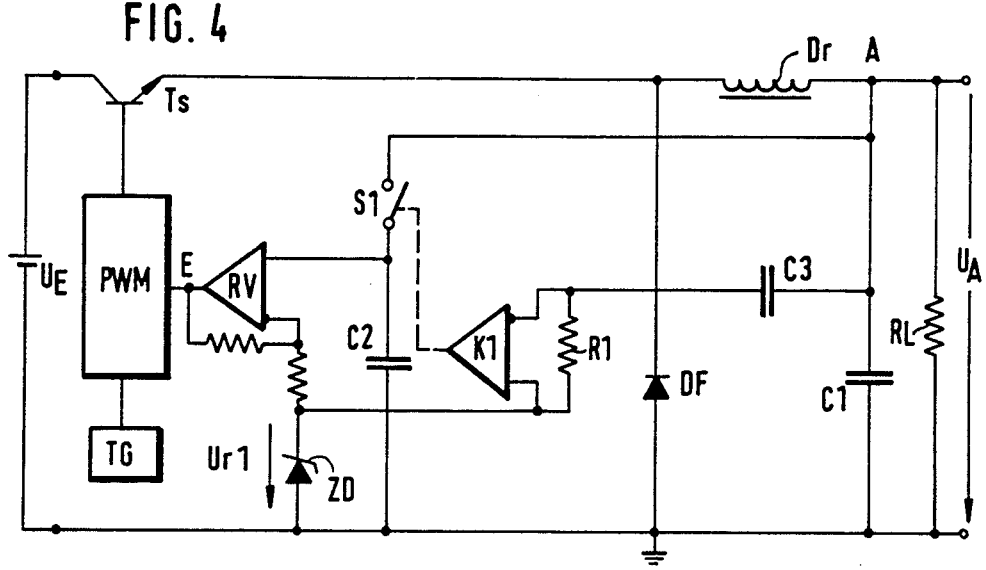
FIG. 4 is a schematic circuit diagram of a further modification of the switching regulator of FIG. 1 wherein the measuring sensor comprises a d.c. voltage isolating capacitor and a subsequently connected measuring resistor.

FIG. 4 shows a switching regulator whose measuring sensor MF is designed differently than in the embodiment of FIG. 2. Measuring sensor MF here includes a direct voltage separating capacitor C3 with a subsequently connected measuring resistor R1. The terminal of direct voltage separating capacitor C3 which is remote from the measuring resistor R1 is connected to a connecting line between potential carrying output terminal A and smoothing capacitor C1. Measuring resistor R1, which is connected subsequent to direct voltage separating capacitor C3, bridges the input terminals of comparator K1. The corresponding illustrations in FIG. 3 apply to the time curves of the currents and voltages. The design of the measuring sensor shown in FIG. 4 has the advantage that the limiting condition of $R_{ESR} >> 1/\omega C1$) need no longer be met. A voltage proprotional to the alternating component of the output voltage $U_A$ is generated across the measuring resistor R1.

Figure 5:
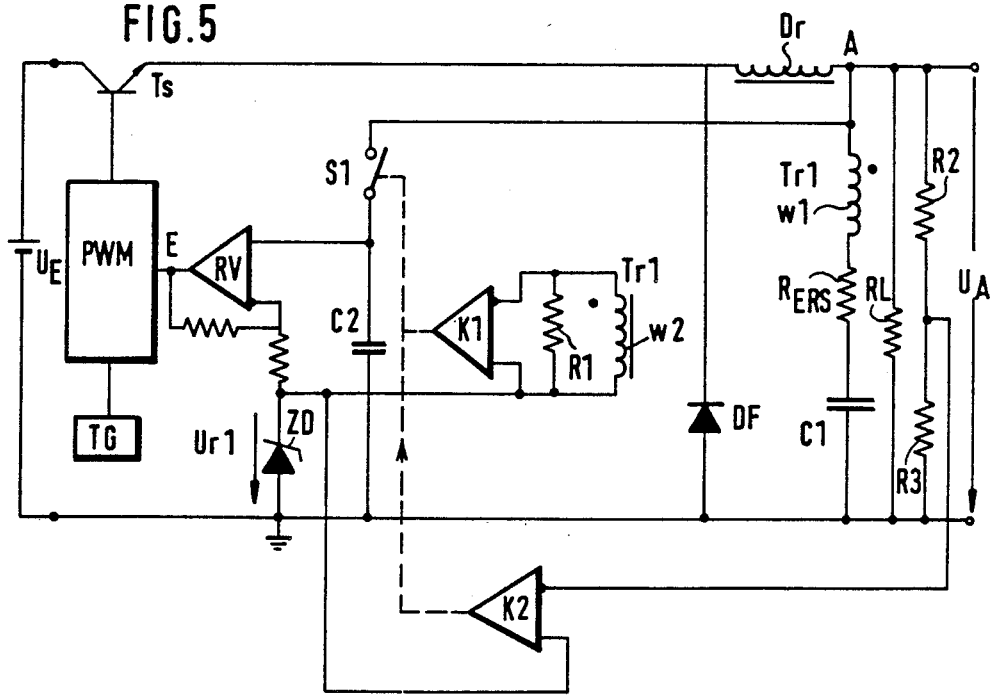
FIG. 5 is a schematic circuit diagram of a still further modification of the switching regulator of FIG. 1 having a second comparator.

FIG. 5 shows an advantageous embodiment of a switching regulator which is particularly favorable with respect to fast removal of loads. In the switching regulator according to FIG. 2, an average value of the output voltage during one clock period T is detected only between times $t_0$ to $t_1$ and $t_3$ to $t_5$, etc.; i.e. when switch S1 is closed. If now a sudden removal of the load at the output occurs between times $t_1$ and $t_2$, storage capacitor C2 is unable to detect the voltage rise $U_A$. Therefore an erroneous average value may be used for the regulation. By using a second comparator K2, such a change in the output voltage $U_A$ can also be detected. Therefore, the second comparator K2 in FIG. 5 is connected in such a manner that if the output voltage $U_A$ rises above a certain thershold, which is higher than the response threshold of the first comparator K1, the electronic switch S1 is closed by an output signal from comparator K2 and thus it is also possible, via switch S1 and by means of storage capacitor C2, to determine the momentary value of the direct voltage $U_A$ during time intervals $t_0$ to $t_1$, $t_3$ to $t_5$, etc. For this purpose, a voltage divider, including resistors R2, R3, is provided in parallel with the load resistor RL, and the center tap of this voltage divider R2, R3 is connected with one input of the comparator K2. The other output of comparator K2 is charged with that reference voltage Ur1 which also determines the reference potential of comparator K1.

The output of comparator K2, like the output of comparator K1, is connected with the control input of electronic switch S1. Voltage divider R2, R3 is dimensioned in such a way that K2 responds, i.e., closes electronic switch S1, at a value which is higher than the peak value $U_{sw}$ (see FIG. 3d) which output voltage $U_A$ would reach as its maximum if electronic switch S1 were not switched on by K1.

Figure 6:
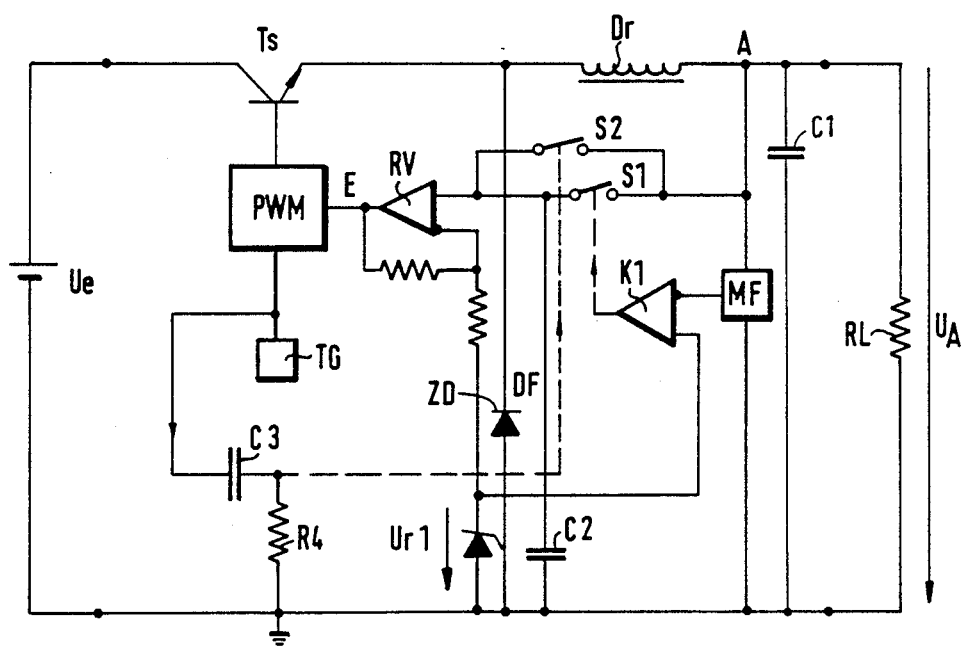

FIG. 6 shows a further embodiment of a switching regulator. In this embodiment, the first electronic switch S1, which is activated in the same manner as in the above described embodiments, is connected in parallel with a further electronic switch S2. The control input of switch S2 is connected with the output of the clock pulse generator TG. Via the output pulse from clock pulse generator TG, the further electronic switch S2 receives its closing instruction at the end of each switching period T, see FIG. 3. Switch S2 is thus forced into the on or closed state by the clock pulse generator TG, thus permitting the correct determination of the momentary value of the direct voltage at sudden reductions in load at the output. To reach a defined turn-on pulse, the reactangular output signal of the clock pulse generator TG is fed via a differentiating circuit formed of resistor R4, and capacitor C3, to the control input of electronic switch S2.

For the component units comprising the pulse width modulator PWM and the clock pulse generator TG, an integrated circuit can be employed, for example an LAS 3800 or an LAS 6300. For the electronic switches S1 and S2, which must be designed as bistable switches, the integrated circuit 4066, for example, can be employed.

It should be noted that although FIG. 5 illustrates the use of the additional comparator K2 in a regulator circuit arrangement as shown in FIG. 2, the further comparator K2 may equally well be used with the general arrangement of FIG. 1 as well as with the arrangement of FIG. 4. Moreover, the further electronic switch S2 of FIG. 6 may be used in any of the illustrated circuit arrangements, e.g. FIGS. 2, 4 or 5.

It will be understood that the above description of the present invention is susceptible to various modifications, changes and adaptations, and the same are intended to be comprehended within the meaning and range of equivalents of the appended claims.

What is claimed is:

1. A switching voltage regulator circuit comprising in combination: first and second input terminals for a source of unregulated voltage; first and second output terminals for connection to a load; said second input terminal and said second output terminal being connected to a point of reference potential; a switching transistor having its emitter collector path connected between said first input and said first output terminals; a pulse width modulator having an output connected to the base of said switching transistor for controlling the conducting state of said transistor; measuring sensor means, connected to said output terminals, for detecting the alternating component of the output voltage or current of said regulator; a comparator having a first input connected to the output of said measuring means and a second input connected to a source of reference voltage; an electronic switch having a first terminal connected to said first output terminal and a second terminal connected to the control input of said pulse width modulator; storage means, connected between said second terminal of said electronic switch and said point of reference potential, for storing the momentary value of the output voltage of said switching regulator when said electronic switch is closed; and wherein the output of said comparator is connected with the control input of said electronic switch to control the closing and opening of same.

2. A voltage regulator as defined in claim 1 further comprising a smoothing capacitor connected across said first and second output terminals; a smoothing choke connected between said switching transistor and said first output terminal; and a diode connected between the common point of connection of said choke and said switching transistor and said point of reference potential.

3. A voltage regulator as defined in claim 2 further comprising a Zener diode connected between said second input of said comparator and said point of reference potential to provide said reference voltage.

4. A voltage regulator as defined in claim 1 wherein said measuring sensor means comprises a measurement transformer having its primary winding connected between said first output terminal and one end of a smoothing capacitor whose other end is connected to said point of reference potential, and having its secondary winding connected in parallel with a measuring resistor connected across said first and second inputs of said comparator.

5. A voltage regulator as defined in claim 4 further comprising a regulating amplifier connected between said electronic switch and said control input of said pulse width modulator.

6. A voltage regulator as defined in claim 4 further comprising a further comparator having its output connected to said control input of said electronic switch, and first and second inputs, said first input of said further comparator being connected to said second input of the first mentioned said comparator, whereby said first input of said further comparator is connected to and is charged with said reference voltage, and means, connected to said second input of said further comparator, for applying a value proportional to the output voltage of said switching regulator to said second input of said further comparator such that the response value of said further comparator for closing said electronic switch is higher than that of said first mentioned said comparator.

7. A voltage regulator as defined in claim 6 wherein said means connected to said second input of said further comparator comprises a voltage divider connected between said first and second output terminals, and having its center tap connected to said second input of said further comparator.

8. A voltage regulator as defined in claim 1 wherein: said measuring sensor means comprises a direct voltage separating capacitor connected between said first output terminal and said first input of said comparator, and a measuring resistor connected across said first and second inputs of said comparator; and a smoothing capacitor connected between said first and second output terminals.

9. A voltage regulator as defined in claim 8 further comprising a regulating amplifier connected between said electronic switch and said control input of said pulse width modulator.

10. A voltage regulator as defined in claim 1 further comprising a further comparator having its output connected to said control input of said electronic switch, and first and second inputs, said first input of said further comparator being connected to said second input of the first mentioned said comparator, whereby said first input of said further comparator is connected to and is charged with said reference voltage, and means, connected to said second input of said further comparator, for applying a value proportional to the output voltage of said switching regulator to said second input of said further comparator such that the response value of said further comparator for closing said electronic switch is higher than that of said first mentioned said comparator.

11. A voltage regulator as defined in claim 10 wherein said means connected to said second input of said further comparator comprises a voltage divider connected between said first and second output terminals, and having its center tap connected to said second input of said further comparator.

12. A voltage regulator as defined in claim 1 further comprising: a clock pulse generator for said pulse width modulator; a further electronic switch connected in parallel with the first mentioned said electronic switch; and circuit means for connecting the output said clock pulse generator to the control input of said further electronic switch.

13. A voltage regulator as defined in claim 12 wherein said circuit means for connecting the output of said clock pulse generator to the control input of said further electronic switch includes a differentiating circuit.

14. A voltage regulator as defined in claim 1 further comprising a diode connected between said point of reference potential and the terminal of said switching transistor connected to said first output terminal; and a smoothing capacitor connected between said first and second output terminals and to said measuring sensor means; and wherein said comparator is responsive to the output signal from said measuring sensor means to close said electronic switch during the time energy is flowing out of said smoothing capacitor.

15. A voltage regulator circuit as defined in claim 14 wherein said comparator is responsive to the output signal from said measuring sensor means to: (a) open said electronic switch at the moment of the zero passage of said alternating component and keep said electronic switch open as long as current flows into said smoothing capacitor and the momentary value of the output voltage of said regulator circuit is greater than the average value of said output voltage; and (b) cause said electronic switch to be closed during the time current flows out of said smoothing capacitor and the momentary value of said output voltage of said regulator circuit is less than said average value of said output voltage.

\* \* \* \* \*